United States Patent
Kettner et al.

(10) Patent No.: US 12,514,313 B2
(45) Date of Patent: *Jan. 6, 2026

(54) GLOVE

(71) Applicant: Workaround GmbH, Munich (DE)

(72) Inventors: Michael Kettner, Munich (DE);
Matthias Kirchner, Munich (DE)

(73) Assignee: WORKAROUND GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,162

(22) Filed: Sep. 28, 2023

(65) Prior Publication Data

US 2024/0016247 A1 Jan. 18, 2024

Related U.S. Application Data

(63) Continuation of application No. 16/426,209, filed on May 30, 2019, now Pat. No. 11,805,829.

(30) Foreign Application Priority Data

May 30, 2018 (DE) ...................... 10 2018 112 945.9

(51) Int. Cl.
*A41D 19/00* (2006.01)
*A41D 19/015* (2006.01)

(52) U.S. Cl.
CPC ....... *A41D 19/015* (2013.01); *A41D 19/0024* (2013.01); *A41D 19/0037* (2013.01); *A41D 19/0034* (2013.01)

(58) Field of Classification Search
CPC ............ A41D 19/0003; A41D 19/0013; A41D 19/0024
See application file for complete search history.

(56) References Cited

U.S. PATENT DOCUMENTS 1,165,970 A 12/1915 Harris
1,173,269 A * 2/1916 Heidemann ............... F21L 4/00
116/35 R (Continued)

FOREIGN PATENT DOCUMENTS

CN 2109745 7/1992
CN 107616787 A 1/2018
(Continued)

OTHER PUBLICATIONS

Borghetti M. et al., "Sensorized Glove for Measuring Hand Finger Flexion for Rehabilitation Purposes," IEEE Transactions on Instrumentation and Measurement, vol. 62, No. 12, Dec. 2013.

(Continued)

*Primary Examiner* — Richale L Quinn
(74) *Attorney, Agent, or Firm* — Dilworth IP, LLC

(57) ABSTRACT

A glove, in particular a work glove, having a palm section covering the palm of the hand, a back section covering the back of the hand and a trigger device. The trigger device is provided at the point on the glove which, when the glove is being worn, rests against the radial side of the metacarpophalangeal joint of the index finger of a user's hand. The glove has a band-like base body, which includes the palm section and the back section, wherein the trigger device is, at least for the most part, provided on a tongue of the base body, which protrudes on the finger side beyond at least one of the finger-side edge of the palm section and an imaginary extension of the finger-side edge of the palm section.

18 Claims, 5 Drawing Sheets

(56) References Cited

U.S. PATENT DOCUMENTS

| | | | |
|---|---|---|---|
| 1,267,436 A | 5/1918 | Martin | |
| 2,172,167 A * | 9/1939 | Leventhal | G09F 21/02 340/321 |
| 3,512,776 A | 5/1970 | Thomas, Sr. | |
| 3,700,836 A | 10/1972 | Rackson | |
| 3,790,168 A | 2/1974 | Hashimoto | |
| 4,504,980 A | 3/1985 | Butcher | |
| 4,575,075 A * | 3/1986 | Tarbox | A63B 21/065 2/161.1 |
| 4,658,441 A * | 4/1987 | Smith | A41D 13/087 2/21 |
| 4,766,299 A | 8/1988 | Tierney | |
| 5,133,233 A * | 7/1992 | Erwin | A41D 19/0024 2/160 |
| 5,191,197 A | 3/1993 | Metlitsky | |
| 5,212,372 A | 5/1993 | Quick | |
| 5,255,167 A | 10/1993 | Toussaint | |
| 5,319,185 A | 6/1994 | Obata | |
| 5,329,106 A | 7/1994 | Hone | |
| 5,340,972 A | 8/1994 | Sandor | |
| 5,365,213 A * | 11/1994 | Paull | G08B 21/0297 340/321 |
| 5,396,053 A | 3/1995 | Swartz | |
| 5,397,296 A | 3/1995 | Sydor | |
| 5,406,649 A * | 4/1995 | Bolembach | A41F 1/06 2/158 |
| 5,459,883 A * | 10/1995 | Garceau-Verbeck | A63B 71/146 2/161.4 |
| 5,514,861 A | 5/1996 | Swartz | |
| 5,550,366 A | 8/1996 | Roustaei | |
| 5,580,154 A | 12/1996 | Coulter | |
| 5,592,694 A * | 1/1997 | Yewer, Jr. | A41D 13/081 2/161.1 |
| 5,610,387 A | 3/1997 | Bard | |
| 5,625,180 A | 4/1997 | Hanson | |
| 5,640,712 A | 6/1997 | Hansen | |
| 5,654,534 A | 8/1997 | Coleman | |
| 5,787,896 A | 8/1998 | Sackett | |
| 5,898,161 A | 4/1999 | DeVita | |
| 5,924,136 A * | 7/1999 | Ogean | A45C 11/182 2/163 |
| 6,154,199 A | 11/2000 | Butler | |
| 6,232,960 B1 | 5/2001 | Goldman | |
| 6,234,393 B1 * | 5/2001 | Paratore | G06K 7/10891 235/462.46 |
| 6,341,376 B1 | 1/2002 | Smerdon, Jr. | |
| 6,505,776 B1 | 1/2003 | Wilz, Sr. | |
| 6,853,293 B2 | 2/2005 | Swartz | |
| 6,991,364 B2 | 1/2006 | Yang | |
| 7,307,242 B1 | 12/2007 | Chen | |
| 7,480,944 B2 * | 1/2009 | Nascimento | A63B 71/148 2/162 |
| 7,504,949 B1 | 3/2009 | Rouaix | |
| 7,837,112 B2 | 11/2010 | An | |
| 7,959,314 B1 | 6/2011 | Rodriguez | |
| 8,038,310 B1 * | 10/2011 | Hale | A41D 19/0157 2/159 |
| 8,230,522 B1 * | 7/2012 | Bell | F21V 33/0008 2/160 |
| 8,235,294 B2 | 8/2012 | Miller | |
| 8,376,759 B2 | 2/2013 | Debock | |
| 8,449,541 B2 | 5/2013 | Schneider | |
| 8,523,377 B1 * | 9/2013 | York | F21V 21/08 362/570 |
| 8,540,389 B2 | 9/2013 | Tang | |
| 8,562,165 B2 | 10/2013 | Thompson | |
| 9,082,293 B2 | 7/2015 | Wellman | |
| 9,235,742 B1 | 1/2016 | Qaddoura | |
| 9,301,562 B1 | 4/2016 | Chen | |
| 9,785,877 B1 | 10/2017 | Fink | |
| 9,842,288 B1 | 12/2017 | Debates | |
| 9,895,106 B1 | 2/2018 | Graybill | |
| 9,900,061 B1 | 2/2018 | Lui | |
| 10,064,276 B2 | 8/2018 | Williams | |
| 10,135,213 B2 | 11/2018 | Brunnbauer | |
| 10,537,143 B2 | 1/2020 | Guenther | |
| 10,789,436 B1 | 9/2020 | Lim | |
| 10,817,689 B2 | 10/2020 | Mazzone | |
| D922,063 S * | 6/2021 | Kirchner | D3/218 |
| 11,044,898 B2 | 6/2021 | Deeb | |
| 11,059,076 B2 | 7/2021 | Bauer | |
| 11,121,515 B2 | 9/2021 | Chahine | |
| 11,182,575 B2 * | 11/2021 | Sakamoto | G06K 7/10881 |
| 11,326,960 B2 | 5/2022 | Larsen | |
| 11,361,391 B2 | 6/2022 | Ottnad | |
| D964,376 S | 9/2022 | Sittig | |
| 11,464,450 B2 | 10/2022 | Huang | |
| 11,470,895 B2 * | 10/2022 | Guenther | A41D 19/0027 |
| 11,520,314 B2 | 12/2022 | Schwarz | |
| 11,899,838 B2 | 2/2024 | Hogbin | |
| 2002/0080031 A1 | 6/2002 | Mann | |
| 2002/0163495 A1 | 11/2002 | Doynov | |
| 2002/0194668 A1 | 12/2002 | Kwon | |
| 2003/0006962 A1 | 1/2003 | Bajramovic | |
| 2003/0011469 A1 * | 1/2003 | Bush | G08B 15/004 340/326 |
| 2003/0026170 A1 | 2/2003 | Yang | |
| 2004/0025227 A1 | 2/2004 | Jaeger | |
| 2004/0128736 A1 | 7/2004 | Raz | |
| 2005/0052412 A1 | 3/2005 | McRae | |
| 2006/0033710 A1 | 2/2006 | Bajramovic | |
| 2006/0044112 A1 | 3/2006 | Bridgelall | |
| 2006/0108425 A1 | 5/2006 | Wiklof | |
| 2007/0083968 A1 | 4/2007 | Stokes | |
| 2007/0083979 A1 * | 4/2007 | Daniels | A45F 5/00 2/160 |
| 2007/0146127 A1 | 6/2007 | Stilp | |
| 2007/0245454 A1 * | 10/2007 | Eklund | G06F 3/0488 2/161.6 |
| 2007/0288104 A1 | 12/2007 | Yamauchi | |
| 2008/0054062 A1 | 3/2008 | Gunning | |
| 2008/0071429 A1 | 3/2008 | Kraimer et al. | |
| 2008/0136778 A1 * | 6/2008 | Hursh | G06F 3/014 345/164 |
| 2008/0262666 A1 | 10/2008 | Manning | |
| 2009/0056107 A1 | 3/2009 | Williams | |
| 2009/0057289 A1 | 3/2009 | Williams | |
| 2009/0057290 A1 | 3/2009 | Williams | |
| 2009/0121026 A1 * | 5/2009 | Druker | G06K 7/10891 235/462.44 |
| 2009/0156309 A1 | 6/2009 | Weston | |
| 2009/0179739 A1 | 7/2009 | Kim | |
| 2009/0247299 A1 | 10/2009 | Conticello | |
| 2010/0023314 A1 | 1/2010 | Hernandez-Rebollar | |
| 2010/0090949 A1 | 4/2010 | Tianqiao | |
| 2010/0097195 A1 | 4/2010 | Majoros | |
| 2010/0156783 A1 | 6/2010 | Bajramovic | |
| 2010/0234182 A1 | 9/2010 | Hoffman | |
| 2011/0016609 A1 | 1/2011 | Phelps | |
| 2011/0078842 A1 | 4/2011 | Tang | |
| 2011/0122601 A1 * | 5/2011 | Waters | A42B 1/244 2/209.13 |
| 2011/0296576 A1 | 12/2011 | Mitchell | |
| 2012/0025945 A1 | 2/2012 | Yazadi | |
| 2012/0157263 A1 | 6/2012 | Sivak | |
| 2012/0187192 A1 * | 7/2012 | Lee | G06K 7/10891 235/462.44 |
| 2012/0223143 A1 | 9/2012 | Turbovich | |
| 2013/0087544 A1 | 4/2013 | Kremer | |
| 2013/0197720 A1 | 8/2013 | Kraimer | |
| 2013/0258644 A1 | 10/2013 | Comunale | |
| 2014/0096306 A1 * | 4/2014 | Hill | A41D 19/0034 2/158 |
| 2014/0125577 A1 | 5/2014 | Hoang | |
| 2014/0132410 A1 | 5/2014 | Chang | |
| 2014/0172134 A1 | 6/2014 | Meschter | |
| 2014/0194166 A1 * | 7/2014 | Falck | H04B 1/385 455/567 |
| 2014/0214631 A1 | 7/2014 | Hansen | |
| 2014/0215686 A1 * | 8/2014 | McMakin, Jr. | A63B 71/141 2/161.1 |

(56) References Cited

U.S. PATENT DOCUMENTS

| | | | |
|---|---|---|---|
| 2014/0249944 A1* | 9/2014 | Hicks | G07G 1/0081 |
| | | | 235/383 |
| 2014/0282923 A1 | 9/2014 | Narayan | |
| 2014/0366249 A1* | 12/2014 | West | A44C 3/001 |
| | | | 2/244 |
| 2015/0040880 A1* | 2/2015 | Tseng | F41B 11/62 |
| | | | 124/71 |
| 2015/0070162 A1 | 3/2015 | Vorhies | |
| 2015/0130698 A1 | 5/2015 | Burgess | |
| 2015/0150321 A1* | 6/2015 | Vorhies | B62J 6/056 |
| | | | 340/475 |
| 2015/0257733 A1 | 9/2015 | Corbett, III | |
| 2015/0286976 A1 | 10/2015 | Hirschfeld | |
| 2015/0314195 A1 | 11/2015 | Bekri | |
| 2015/0375042 A1 | 12/2015 | Schaffer | |
| 2016/0016065 A1 | 1/2016 | Tan | |
| 2016/0018901 A1 | 1/2016 | Woolley | |
| 2016/0033238 A1 | 2/2016 | Cooper | |
| 2016/0066636 A1* | 3/2016 | West | A45F 5/021 |
| | | | 150/154 |
| 2016/0068214 A1 | 3/2016 | Tang | |
| 2016/0128406 A1 | 5/2016 | Shiue | |
| 2016/0161301 A1 | 6/2016 | Guenther | |
| 2016/0174897 A1 | 6/2016 | Sherman | |
| 2016/0284236 A1 | 9/2016 | Bavunoglu | |
| 2017/0068276 A1 | 3/2017 | Wagman | |
| 2017/0119553 A1 | 5/2017 | Cipriani | |
| 2017/0168565 A1 | 6/2017 | Cohen | |
| 2017/0215497 A1 | 8/2017 | Frederick | |
| 2017/0265561 A1 | 9/2017 | Beers | |
| 2017/0296098 A9 | 10/2017 | Ban | |
| 2017/0338610 A1* | 11/2017 | Brunnbauer | H01R 33/97 |
| 2018/0027344 A1 | 1/2018 | Dzarnoski, Jr. | |
| 2018/0146720 A1* | 5/2018 | Sittig | A41D 1/002 |
| 2018/0213758 A1 | 8/2018 | Deeb | |
| 2018/0295908 A1* | 10/2018 | Hollo | A45F 5/02 |
| 2018/0326592 A1 | 11/2018 | Kogan | |
| 2018/0376043 A1 | 12/2018 | Schannath | |
| 2019/0197273 A1* | 6/2019 | Mazzone | G06K 7/10396 |
| 2019/0209086 A1 | 7/2019 | Huang | |
| 2019/0213363 A1* | 7/2019 | Sugiura | G06K 7/109 |
| 2019/0216144 A1 | 7/2019 | York | A41D 27/085 |
| 2019/0364996 A1* | 12/2019 | Kettner | A41D 19/0024 |
| 2020/0022433 A1* | 1/2020 | Lu | G06K 7/10603 |
| 2020/0134275 A1 | 4/2020 | Sakamoto | |
| 2020/0160016 A1 | 5/2020 | Sakamoto | |
| 2020/0237032 A1* | 7/2020 | Berlips | A41D 19/0027 |
| 2020/0245939 A1 | 8/2020 | Sittig | |
| 2020/0305522 A1* | 10/2020 | Ruhland | G06F 3/014 |
| 2020/0359721 A1* | 11/2020 | Meroe | A41D 19/01558 |
| 2020/0404993 A1 | 12/2020 | Phillips | |
| 2021/0033472 A1 | 2/2021 | Turner | |
| 2021/0219639 A1* | 7/2021 | Kettner | A41D 13/081 |
| 2021/0307433 A1* | 10/2021 | Hollo | A45F 5/02 |
| 2022/0053854 A1* | 2/2022 | Oner | A41D 19/0027 |
| 2023/0112442 A1* | 4/2023 | Kettner | G06K 7/1417 |
| | | | 2/160 |
| 2024/0164459 A1* | 5/2024 | Clark | A41D 19/0027 |
| 2024/0237767 A1* | 7/2024 | Kettner | H03K 17/96 |

FOREIGN PATENT DOCUMENTS

| | | | | |
|---|---|---|---|---|
| CN | 113144571 A * | 7/2021 | | A63B 71/141 |
| DE | 202005003216 | 5/2005 | | |
| DE | 202013105192 | 12/2013 | | |
| DE | 102014117164 | 1/2016 | | |
| DE | 202015107112 | 1/2016 | | |
| DE | 102015111506 A1 | 4/2016 | | |
| DE | 102015113847 | 4/2016 | | |
| DE | 102015214331 | 2/2017 | | |
| DE | 102015122281 | 6/2017 | | |
| DE | 102015224308 | 6/2017 | | |
| DE | 102016109117 | 11/2017 | | |
| DE | 102016109117 A1 * | 11/2017 | | A41D 19/0024 |
| DE | 102017107357 A1 | 4/2018 | | |
| DE | 102017203495 | 9/2018 | | |
| EP | 0613762 | 9/1994 | | |
| EP | 1894481 A1 * | 3/2008 | | A41D 19/0024 |
| EP | 2578096 A1 | 4/2013 | | |
| EP | 2693689 | 2/2014 | | |
| EP | 3069623 | 9/2016 | | |
| EP | 3208687 | 8/2017 | | |
| EP | 3644217 A1 * | 4/2020 | | G06K 7/10396 |
| EP | 3654229 A1 * | 5/2020 | | G06K 7/10891 |
| GB | 2386667 A | 9/2003 | | |
| GB | 2386677 | 9/2003 | | |
| GB | 2422527 | 8/2006 | | |
| GB | 2441295 | 3/2008 | | |
| JP | 2011094246 | 5/2011 | | |
| KR | 20100024593 A | 3/2010 | | |
| KR | 20110115497 A | 10/2011 | | |
| TW | M484318 | 8/2014 | | |
| WO | 9318675 | 9/1993 | | |
| WO | 9850839 | 11/1998 | | |
| WO | 02088918 | 11/2002 | | |
| WO | 03005176 | 1/2003 | | |
| WO | 2006077572 | 7/2006 | | |
| WO | 2008075859 | 6/2008 | | |
| WO | 2012036775 | 3/2012 | | |
| WO | 2014011196 | 1/2014 | | |
| WO | 2016012480 | 1/2016 | | |
| WO | 2017062621 | 4/2017 | | |
| WO | 2018073420 A1 | 4/2018 | | |
| WO | 2018076067 A1 | 5/2018 | | |

OTHER PUBLICATIONS

Dipietro L. et al., "A Survey of Glove-Based Systems and Their Applications," IEEE Transactions on Systems, Man, and Cybernetics—Part C: Applications and Reviews, vol. 38, No. 4, Jul. 2008.

Kim, J-H. et al., 3-D Hand Motion Tracking and Gesture Recognition Using a Data Glove, IEEE International Symposium on Industrial Electronics (ISIE 2009), Seoul Olympic Parktel, Seoul, Korea, Jul. 5-8, 2009.

King, R. C. et al., "Development of a Wireless Sensor Glove for Surgical Skills Assessment," IEEEE Transactions on Information Technology in Biomedicine, vol. 13, No. 5, Sep. 2009.

Simone, L. K. et al., "A low cost instrumented glove for extended monitoring and functional hand assessment," Journal of Neuroscience Methods 160 (2007) 335-348.

Sturman, D.J. et al., "A Survey of Glove-based Input," IEEE Computer Graphics & Applications (1994) 33-39.

Ziegler, J. et al., "Advanced Interaction Metaphors for RFID-Tagged Physical Artefacts," 2011 IEEE International Conference on RFID-Technologies and Applications, 73-80.

Albert Schweitzer: "Rigid-Flex, Flex and Semi-Flex Leiterplatten Technologie", Mar. 17, 2017, https://www.flowcad.ch/cms/upload/downloads/PCBRoadshow20lFlex.pdf (89 pages).

* cited by examiner

GLOVE

FIELD OF THE DISCLOSURE

The disclosure relates to a glove, in particular a work glove with a trigger device.

BACKGROUND

Gloves with electrical triggers are known, and are used for example in combination with one or more electronics modules. These electronics modules usually have sensors and can likewise be secured to the glove, such that a sensor system that can be worn results, a so-called "wearable".

For example, the electronics module is a barcode scanner and the trigger serves to trigger a scanning process. The trigger can also be used for other purposes, such as to count processes or to operate further units of the wearable.

The electrical trigger must therefore be easy to trigger but also protected against accidental triggering. Easy-to-reach triggers on exposed areas, such as the palm of the hand or on the index finger, can be quickly triggered by mistake.

Moreover, a relatively large movement is necessary to trigger those triggers. In addition, those triggers cannot be reached if the hand is gripping an object.

SUMMARY

There is a need to provide a glove with a trigger device in which an actuation of the trigger is possible with ease, even if the hand is gripping objects.

The object is achieved by a glove, in particular a work glove, with a palm section covering the palm of the hand, a back section covering the back of the hand and a trigger device, wherein the trigger device is provided at the point on the glove which, when the glove is being worn, rests against the radial side of the metacarpophalangeal joint of the index finger of a user's hand. The glove has a band-like base body, which comprises the palm section, the back section and optionally a thumb hole. The trigger device is, at least for the most part, provided on a tongue of the base body, which protrudes on the finger side beyond the finger-side edge of the palm section and/or an imaginary extension of the finger-side edge of the palm section.

Because the trigger device is provided on the metacarpophalangeal joint of the index finger, only a very small movement of the thumb is necessary to actuate the trigger. At the same time, the other fingers can continue to grip objects.

Moreover, the trigger is located at an ergonomically easy-to-reach point, as the metacarpophalangeal joint of the index finger as a rule can be touched by the interphalangeal joint of the thumb without bending the thumb. Further, the glove can be easily produced.

A movement of the fingers is thereby prevented from having an effect on the position of the trigger device relative to the hand.

The tongue may protrude beyond the finger-side edge of the back section, but in particular less than it protrudes beyond the finger-side edge of the palm section. Interspaces between hand and glove, which the user could snag on objects, can thereby be avoided.

The radial side is the side of the metacarpophalangeal joint that faces the thumb when the hand is relaxed.

The expression "when being worn" relates to the intended use of the glove on the hand. In particular, the trigger device is secured to the hand without looping around a finger.

By glove is meant within the meaning of this disclosure any item of clothing of which at least parts, in particular the entire item of clothing, are provided to be worn on a hand. The item of clothing can also have at least one strap, which is lashed around the hand in order to wear it on the hand. Of course, the glove can also have no strap.

The band-like base body can have several, in particular three, textile layers or be a circular-knitted or flat-knitted fabric.

For example, the trigger device is provided in a neutral area of the glove with respect to length change when the hand or a finger of the user is moved, with the result that the trigger device always lies in the same position and is barely exposed to any loads.

Those areas of the glove of which the length does not extend or only extends insignificantly in one direction, called the neutral direction, when the fingers or the hand are/is moved in the case of the usual and intended utilization of the glove are regarded as neutral areas of the glove. Neutral areas are located, for example, on the side surfaces of the fingers along the neutral fibers of the fingers in relation to bending of the fingers with a neutral direction parallel to the finger, on the back of the hand proximal to the metacarpophalangeal joints of the fingers and on the surfaces corresponding thereto of the heel of the hand in the direction transverse to the fingers.

Likewise, in the arrangement, for example, no physical loads occur on the electronic connection, such as cables or electrically conductive yarn. Load includes pulling, stretching, bending or the like.

Preferably, the glove has a thumb hole, which is arranged between the back section and the palm section and is bordered by a stop at its finger-side end. The thumb hole has a longitudinal axis and the trigger device is spaced apart from the stop by a first distance in the direction of the longitudinal axis towards the finger side of the glove and/or the thumb hole has a transverse axis and the trigger device is spaced apart from the stop by a second distance in the direction of the transverse axis towards the back section. In this way, it is guaranteed that the trigger device can be actuated ergonomically with the thumb, in particular the interphalangeal joint of the thumb.

The distances are in particular determined from the center of the stop and/or center of the trigger device.

For a particularly good reachability, the first distance is smaller than 50 mm, in particular smaller than 30 mm; the first distance is between 5 mm and 50 mm, in particular between 10 mm and 30 mm large, and/or the second distance is smaller than 40 mm, in particular smaller than 30 mm.

The distances are relative in particular to the center point of the trigger device and/or the trigger surface. For example, the longitudinal axis lies approximately parallel to the index finger in the state when being worn.

In order to guarantee a precise seat, the stop in the state when being worn lies between the metacarpophalangeal joint of the index finger and the carpometacarpal joint of the thumb of the user's hand and/or the thumb hole extends to beyond the carpometacarpal joint of the thumb.

In an embodiment, the trigger device has an actuation element and a trigger surface, through which the actuation element can be actuated, wherein the trigger surface has a principal direction. In this way, the surface via which the actuation element can be actuated can be enlarged, and thus operation can be simplified.

The trigger surface can be rectangular, in particular with rounded corners, round, oval or elliptical.

In particular, the principal direction is the longer of the directions of the thumb hole and lies, for example, between 2 mm and 40 mm, in particular between 15 mm and 25 mm.

The actuation element can be a button. For example, the trigger surface can then be reinforced by a pressure plate, wherein the pressure plate actuates the actuation element. The pressure plate can have the contour of the trigger surface.

The actuation element can also be formed as a capacitive actuation element, such as a touch-sensitive surface. In this case, the trigger surface is part of the actuation element, namely the touch-sensitive surface itself.

In an embodiment, the principal direction in the state when being worn extends substantially along a straight line through the metacarpophalangeal joint of the index finger and the carpometacarpal joint of the thumb and/or in the state when stretched out runs substantially parallel to the longitudinal axis or at an angle of less than 45° to the longitudinal axis. In this way, ergonomics are further improved.

Pressure on any point of the trigger surface can actuate the actuation element.

In an embodiment variant, the trigger device has a protective wall and optionally a pressure plate, which has at least one first section which is provided between the actuation element and/or the trigger surface on the one hand and the longitudinal axis and/or the palm section on the other hand, in particular wherein the protective wall has a further section, which is arranged on the side of the actuation element opposite the first section. In this way, accidental triggers of the actuation element can be securely prevented.

For example, the protective wall extends perpendicularly away from the base body. The protective wall can be rigid. Moreover, the protective wall can completely surround the actuation element.

The protective wall can also be designed taller than the palm section, the back section and/or the entire base body.

To protect the trigger device, the trigger device can have an elastic cover, which completely surrounds the protective wall, the actuation element and optionally the pressure plate.

The cover can extend out of the base body. For example, the cover contains no silicone, can be glued to the base body and/or is deep-drawn.

In a further embodiment variant, the trigger device, the protective wall, the pressure plate and/or the actuation element are covered by a textile layer, whereby a hardwearing protection of the trigger device is achieved.

The glove preferably has a holder for an electronics module, in particular on the back section, wherein the holder has at least one electrical contact element, which is electrically connected to the trigger device. In this way, the glove can be replaced independently of the electronics module.

For a good reachability, the finger-side edge of the palm section or an imaginary extension of the finger-side edge of the palm section when the glove is stretched out intersects the trigger surface and/or runs between the center of the trigger surface and the stop.

For example, the intersection point of the longitudinal axis and the finger-side edge of the palm section in the direction of the longitudinal axis lies between the center of the trigger device and the stop.

In an embodiment variant, the finger-side edge of the palm section when the glove is being worn runs on the wrist side of at least the metacarpophalangeal joint of the index finger, with the result that the fingers can be moved freely.

In a further embodiment, the thumb hole is bordered at its wrist-side end by an elastic element, in particular an elastic band, whereby the wearing comfort is increased.

For example, the elastic band allows the palm section and the back section at the wrist-side end of the thumb hole to move away from each other.

DESCRIPTION OF THE DRAWINGS

Further features and advantages are revealed by the following description as well as by the attached drawings, to which reference is made. In the drawings, there are shown in.

DETAILED DESCRIPTION

Figure 1:
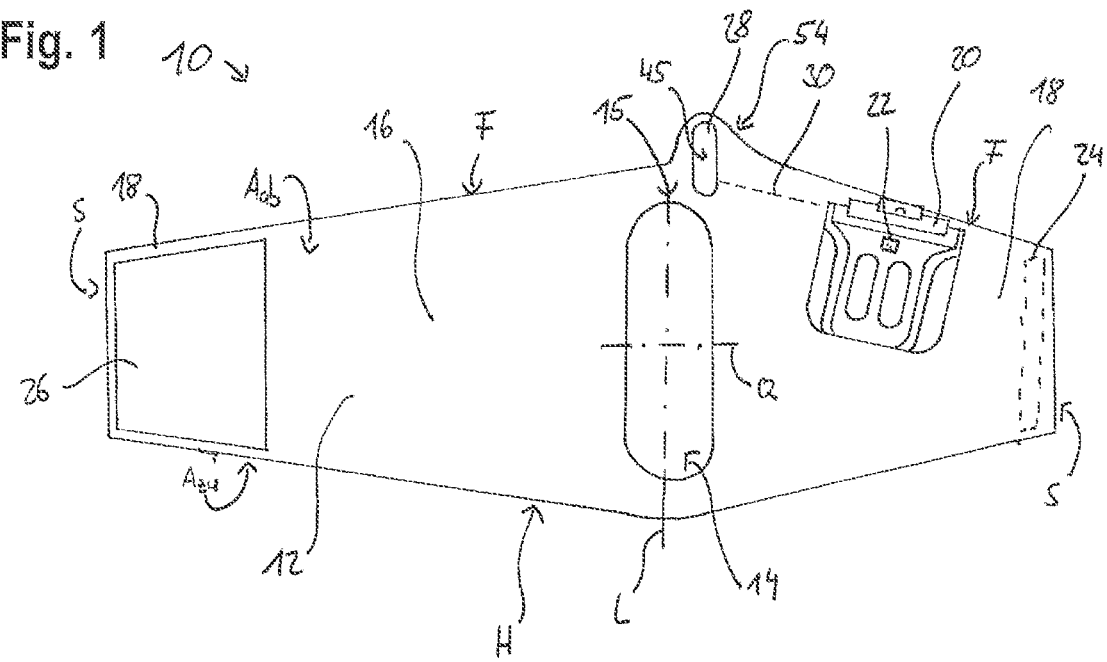
FIG. 1 shows a glove according to the disclosure in the stretched-out state, schematically in a top view.

A glove 10 is represented in FIG. 1. In the situation represented in FIG. 1 the glove is not being worn and lies stretched out on a surface.

The glove 10 is, for example, a work glove, for example for workers on an assembly line or staff in a logistics center.

The glove 10 has a band-like base body 12, which is elastic, for example.

The band-like base body 12 has two short end edges S and two long longitudinal edges, wherein the longitudinal edge which faces the user's fingers when the glove 10 is being worn correctly is called the finger-side edge F. The opposite longitudinal edge then faces the wrist and is therefore called the wrist-side edge H.

Likewise, the base body 12 has a side $A_{ab}$ facing away from the body and a side $A_{zu}$ facing the body, wherein the side $A_{zu}$ facing the body rests against the hand or against a glove worn underneath it by the user when the glove 10 is being worn correctly.

Fingers or appendages for fingers are not provided on the base body 12.

The glove 10 of the embodiment shown is not a full glove with fingers, but a glove which only covers the back and the palm of the user's hand when it is being worn correctly. The glove 10 is thus similar to a wrist warmer or a bandage, which only surrounds parts of the hand and which need not be pulled over the hand, but is closed around the hand.

In the base body 12 a thumb hole 14 is provided which, in the embodiment example shown, has a rectangular shape with semi-circular segments attached and which can extend over almost the entire width of the base body 12, thus almost from the wrist-side edge H to the finger-side edge F.

The base body 12 additionally comprises a palm section 16 and a back section 18, which are separated from each other by the thumb hole 14.

The thumb hole 14 is bordered towards the fingers, thus on the finger side, by a stop 15. In the embodiment example shown, the stop 15 is formed by the apex of the semi-circular segment of the thumb hole 14.

The thumb hole 14 additionally has a longitudinal axis L, which runs parallel to the longitudinal extension of the thumb hole 14 through the stop 15, and a transverse axis Q, which runs perpendicular to the longitudinal axis L.

Figure 4:
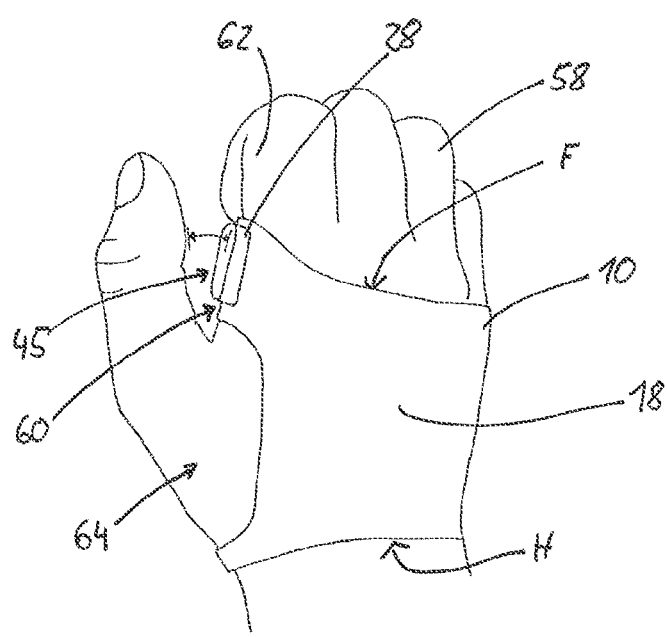
FIGS. 4 and 5 show the glove according to FIG. 1 in the state when being worn on a user's hand.

If the glove 10 is being worn correctly, the palm section 16 is located on the palm of the user's hand (cf. FIG. 5) and the back section 18 is located on the back of the user's hand and covers it (cf. FIG. 4).

The palm section 16 then, for the most part, covers the palm of the user's hand and the back section, for the most part, covers the back of the user's hand.

In FIG. 1 the palm section 16 is arranged to the left of the thumb hole 14. The back section 18 is in two parts, wherein one part of the back section 18 is arranged to the left of the palm section 16 and the other part is arranged to the right of the thumb hole 14.

On the side $A_{ab}$ of the base body 12 facing away from the body, a holder 20 for an electronics module (not shown) is attached to the part of the back section 18 adjoining the thumb hole 14. The electronics module comprises, for example, a barcode scanner.

The holder is provided on the finger-side edge F of the base body 12 and can protrude beyond the finger-side edge F.

In addition, two contact elements 22 for contacting the electronics module are provided on the holder 20.

Moreover, on the side $A_{zu}$ of the base body 12 facing the body, a first securing element 24, which is indicated by dashed lines in FIG. 1, is secured to this back section 18.

The first securing element 24 is located, for example, close to the end edge S.

Likewise on the end edge S, but on the side $A_{ab}$ facing away from the body, a second securing element 26, which cooperates with the first securing element 24 when the glove 10 is being worn correctly, is secured to the back section 18 on the left side, with the result that the base body 12 or the entire glove 10 can be fixed on the user's hand. The first and the second securing element 24, 26 can form, for example, a Velcro fastening.

It is of course also conceivable that the first securing element 24 is provided on the side $A_{ab}$ facing away from the body and the second securing element 26 is provided on the side $A_{zu}$ facing the body.

It is furthermore conceivable that, close to one of the end edges S, a gap or another opening is provided, through which the opposite end edge S and parts of the base body 12 can be pulled. The part of the base body 12 pulled through the gap can then be secured to the part of the base body 12 not pulled through, for example by means of a Velcro fastening, in order to secure the glove 10 on the user's hand.

The glove 10 additionally has a trigger device 28, wherein at least one cable 30, for example a two-core cable, extends from the trigger device 28 to the contact elements 22 of the holder. An electrical connection between the contact elements 22 and the trigger device 28 can thus be produced through the cable 30.

The cable 30 can be formed at least partially by electrically conductive yarn.

Figure 2A:
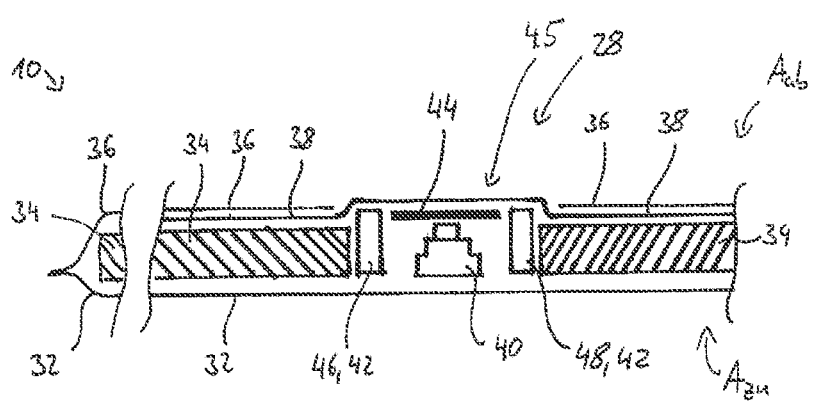
FIG. 2A is a section through the glove according to FIG. 1 in the area of the trigger.

In the first embodiment, the trigger device 28 is integrated in the base body 12, as can be seen in FIG. 2A.

In this embodiment the base body 12 has several textile layers 32, 34, 36, 38, wherein the lower textile layer 32 is provided on the side $A_{zu}$ of the base body 12 facing the body.

The middle textile layer 34 is designed thicker and elastic, and is provided and secured between the upper textile layer 36 and the lower textile layer 32.

On the edges of the base body 12, the middle textile layer 34 is not provided, but the textile layers 36 and 32 there lie directly one on the other.

In the area of the trigger device 28 the middle textile layer 34 and in some circumstances the upper textile layer 36 is interrupted, in order to accommodate the trigger device 28.

The trigger device 28 comprises an actuation element 40, a protective wall 42, a pressure plate 44 and a trigger surface 45.

In the embodiment example shown, the actuation element 40 is a mechanical button, which can electrically connect the two cores of the cable 30.

The actuation element 40 lies on the lower textile layer 32 and is in particular secured to the lower textile layer 32.

The protective wall 42 likewise rests against the lower textile layer 32 and extends perpendicularly away from the side $A_{zu}$ facing the body.

It projects beyond the textile layers 34 and 36, with the result that the trigger device 28 protrudes beyond the base body 12, thus is taller than the palm section 16 and the back section 18.

In addition, the protective wall 42 can be produced from a rigid material, for example a rigid plastic.

Figure 2B:
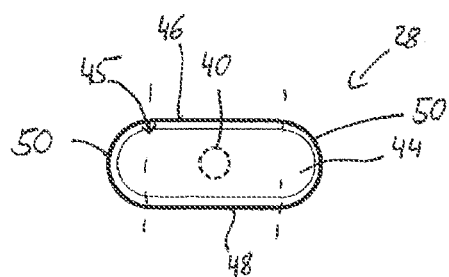
FIG. 2B is a top view of a trigger device of the glove according to FIG. 1.

The protective wall 42 surrounds the actuation element 40 laterally, i.e. towards the edges of the base body 12. This is recognizable in particular in FIG. 2B, in which the protective wall 42 completely surrounds the actuation element 40.

The protective wall 42 has a first section 46 and a further section 48 running parallel thereto, which are provided on opposite sides of the actuation element 40.

The first section 46 of the protective wall 42 lies between the actuation element 40 and the trigger surface 45 on the one hand and the longitudinal axis L and the palm section 16 on the other hand.

The two sections 46, 48 are connected to each other by semi-circular sections 50, with the result that the protective wall 42 forms a ring. The protective wall 42 is in particular not a housing for complex electronic components such as microprocessors, but merely comprises simple components such as the trigger device 28.

In the embodiment example shown the protective wall 42 has the shape of a rectangle with rounded corners. However, it is also conceivable that the protective wall 42 is designed round, oval, elliptical or in another way.

The actuation element 40 is arranged in the center point, e.g. in the centroid of the protective wall 42 or of the trigger surface 45.

It is of course also conceivable that the first section 46 and the further section 48 are designed separated from each other and are not connected to each other. The protective wall 42 can then be in several parts.

Inside the protective wall 42 the pressure plate 44 is provided, which has the same contour as the protective wall 42, thus rectangular with rounded corners in the embodiment example shown.

The pressure plate 44 lies on the actuation element 40 and ends for example flush with the end of the protective wall 42 facing away from the body.

The protective wall 42 and the pressure plate 44 are covered on the side $A_{ab}$ facing away from the body by the textile layer 38, with the result that the entire trigger device 28 including the actuation element 40 is covered.

The trigger device 28 is thus enclosed between the textile layers 32 and 38 and surrounded laterally by the middle textile layer 34.

The textile layer 38 is particularly robust and in the embodiment example shown extends only in the areas of the base body 12 which adjoin the trigger device 28.

The textile layer 38 is secured, in particular glued, between the upper textile layer 36 and the middle textile layer 34, like the other textile layers 32, 34, 36 as well.

The area of the textile layer 38 which lies above the pressure plate 44, i.e. within the area bordered by the protective wall 42, represents the trigger surface 45 of the trigger device 28. The actuation element 40 can be actuated by pressure on the trigger surface 45.

The trigger surface 45 therefore has the same geometry as the protective wall 42 and the pressure plate 44, namely rectangular with rounded corners.

However, it is also conceivable that the trigger surface 45 is rectangular, round, oval or elliptical.

The trigger surface 45 has a principal direction H, which runs parallel to the direction of the largest extent of the trigger surface 45. In this case, this is the direction between the apexes of the semi-circular sections 50. The trigger surface 45 is reinforced by the pressure plate 44.

For example, the trigger surface 45 in the principal direction H is between 2 mm and 40 mm large, in particular between 15 mm and 25 mm.

The principal direction H and the longitudinal axis L run parallel in the embodiment example shown. However, it is also conceivable that they form an angle of less than 45° with each other, which is opened towards the fingers.

Figure 3:
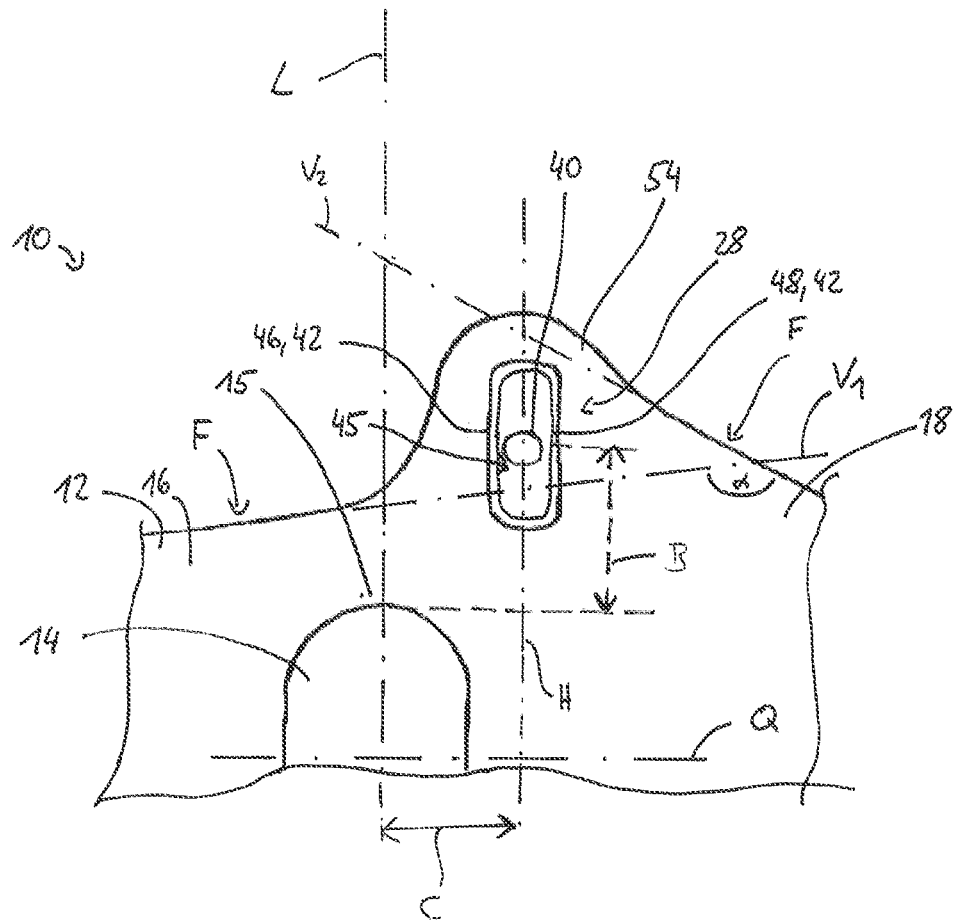
FIG. 3 is an enlarged representation of the area around the trigger of the glove according to FIG. 1 in top view.

In FIG. 3 the position of the trigger device 28 on the glove 10 in relation to the thumb hole 14 is easily recognizable. The entire trigger device 28 is arranged, for example, on the finger side of the thumb hole 14.

The trigger device 28 is provided on a tongue 54 on the base body 12. The tongue 54 extends beyond the finger-side edges F of the palm section 16 and of the back section 18, thus on the finger side beyond the finger-side edge F of the palm section 16 and also of the back section 18, more precisely beyond an imaginary extension $V_1$, $V_2$ of the finger-side edges F of the palm section 16 or of the back section 18.

For example, the extensions $V_1$ and $V_2$ of the finger-side edges F form an angle α in the region of 110° and 160°.

In the embodiment example shown the tongue 54 protrudes less beyond the finger-side edge F of the back section 18 than it protrudes beyond the finger-side edge F of the palm section 16.

The imaginary extension $V_1$ of the finger-side edge F of the palm section 16 intersects the trigger device 28, more precisely the trigger surface 45.

The actuation element 40 lies, for example, on the finger side of the extension $V_1$.

The actuation element 40, in contrast, lies on the wrist side of the extension $V_2$ of the finger-side edge F of the back section 18. In the embodiment example shown the extension $V_2$ does not intersect the trigger surface 45.

In relation to the stop 15 the extension $V_1$ of the palm section 16 runs between the trigger device 28 or the center of the trigger surface 45 and the stop 15.

In other words, the intersection point of the longitudinal axis L and the extension $V_1$ lies between the trigger surface 45 and the stop 15.

The trigger device 28, more precisely the center point of the trigger surface 45, is spaced apart from the stop 15 by a first distance B along the longitudinal axis L.

The first distance B is smaller than 50 mm, in particular smaller than 30 mm. The first distance B can be between 5 mm and 50 mm, in particular between 10 mm and 30 mm large.

In the direction of the transverse axis Q the trigger device 28, more precisely the center of the trigger device 28, is offset by a second distance C towards the back section 18. The second distance C between the center point of the stop 15 and the center point of the trigger device 28 or of the trigger surface 45 lies between 0 mm and 40 mm. For example between 2 mm and 35 mm, in particular between 5 mm and 25 mm.

Figure 5:
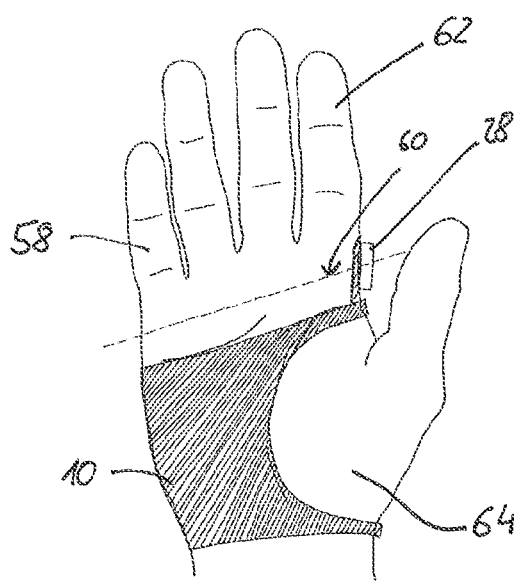

In FIGS. 4 and 5 the glove 10 is shown in the intended state when being worn on a hand.

It is easily recognizable that the back section 18 rests against the back of the hand 58. The palm section 16 correspondingly rests against the palm of the hand 58.

The stop 15 is located, in the state when being worn, between the metacarpophalangeal joint 60 of the index finger 62 and the carpometacarpal joint 64 of the thumb, and the thumb hole 14 extends up to the carpometacarpal joint 64 of the thumb.

The trigger device 28, in the state when being worn correctly, rests against the metacarpophalangeal joint 60 of the index finger 62, more precisely against the radial side, i.e. the side of the metacarpophalangeal joint of the finger facing the thumb.

It is easily recognizable that the trigger device 28 is secured to the hand 58 securely without looping around the index finger 62 or another finger.

When the fingers are extended, the principal axis H of the trigger device 28 or of the trigger surface 45 and the longitudinal axis L of the thumb hole 14 lie parallel to the index finger 62. More precisely, the principal direction H extends along a straight line which runs through the metacarpophalangeal joint 60 of the index finger 62 and through the carpometacarpal joint 64 of the thumb.

In FIG. 5 it is easily recognizable that the finger-side edge F of the palm section 16, in the state when being worn, runs on the wrist side of the metacarpophalangeal joints of the fingers, in particular of the metacarpophalangeal joint 60 of the index finger 62.

Figure 6:
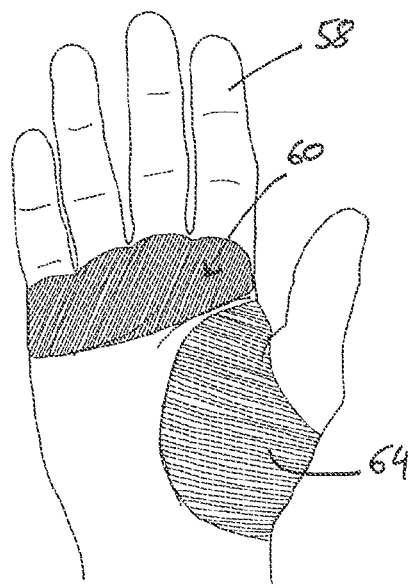
FIG. 6 is a view of the palm of a hand without glove.

The metacarpophalangeal joints of the fingers namely experience a length change when the hand is closed, in that they are compressed. Similarly, the areas around the carpometacarpal joint 64 of the thumb experience compressions and length changes when the thumb or the hand is moved. These areas are represented shaded in FIG. 6.

Areas of the hand which do not experience any length change or load when the fingers are moved, such as for example the radial side of the metacarpophalangeal joint 60 of the index finger 62, are called neutral areas. The load includes pulling, stretching and bending or the like.

Accordingly, the glove 10 likewise has neutral areas, which rest against the neutral areas of the hand. Such a neutral area is precisely the area in which the trigger device 28 is provided.

The cable 30 likewise runs in neutral areas, with the result that it is also load-free when the fingers and the hand are moved.

By positioning the trigger device 28 on the metacarpophalangeal joint 60 of the index finger 62, the position of the trigger device 28 together with the trigger surface 45 remains stable when the hand or the fingers is/are moved, with the result that the user can trigger the trigger device 28 at any time, without turning to look at their hand.

For the triggering the user guides their thumb to the metacarpophalangeal joint 60 of the index finger 62 and then presses on the trigger surface 45 with the interphalangeal joint of the thumb. The pressure plate 44 is pressed onto the actuation element 40, triggering it and completing an electric circuit via the cable 30.

Because of the pressure plate 44, which extends over the entire trigger surface 45, it is not necessary for the user to hit the trigger surface 45 directly above the actuation element 40.

A simple and ergonomic as well as reliable triggering is thereby guaranteed.

To produce the glove 10, for example, the different textile layers 32, 34, 36 and 38 as well as the trigger device 28—either in individual parts or as a prefabricated assembly—the cable 30 and the holder 20 are placed in a die and then pressed or glued together.

Figure 7:
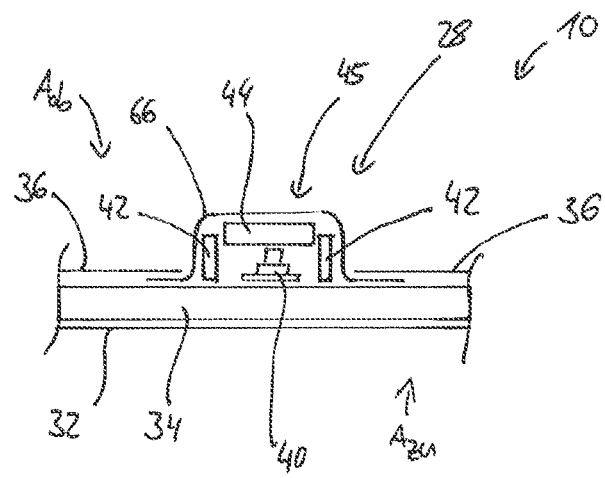
FIG. 7 shows a second embodiment of the glove according to the disclosure in a section through the area of the trigger.
Figure 8:
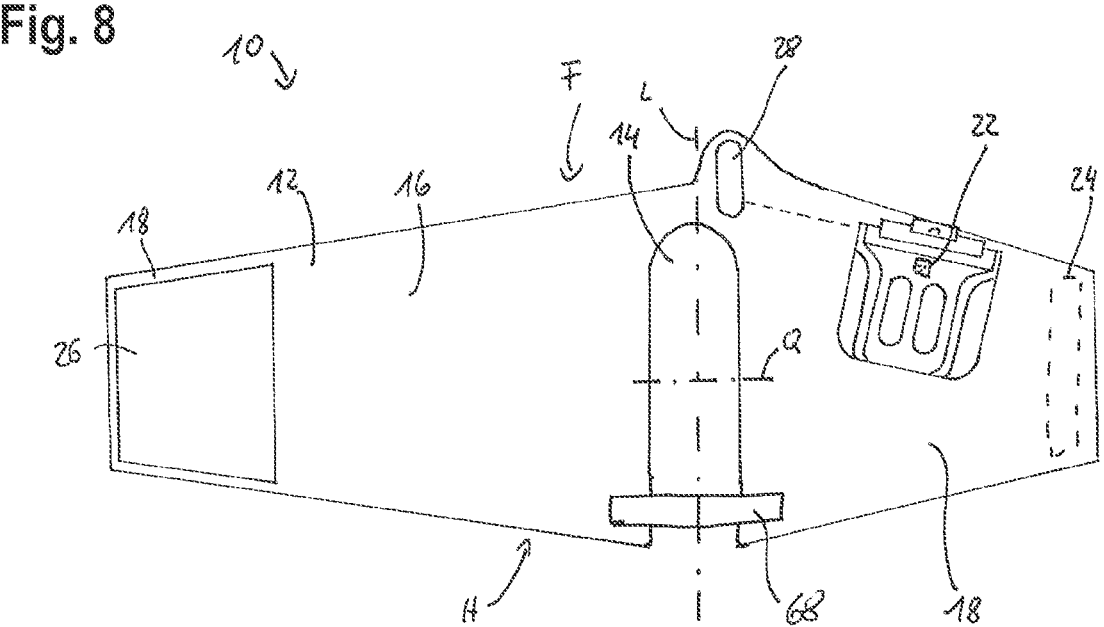
FIG. 8 shows a third embodiment of a glove according to the disclosure in the stretched-out state in a top view.
Figure 9:
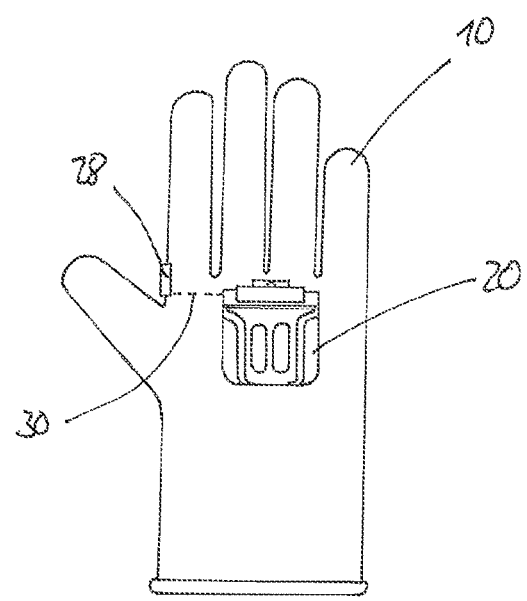
FIG. 9 shows a fourth embodiment of a glove according to the disclosure in top view.

In FIGS. 7 to 9 further embodiments of the glove 10 are represented, which correspond substantially to the first embodiment of the glove 10 of FIGS. 1 to 5. Therefore, only the differences are discussed in the following, and identical and functionally identical parts are given the same reference numbers.

FIG. 7 shows a sectional view of a second embodiment of the glove 10 in the area of the trigger device 28.

Unlike in the first embodiment, the protective wall 42 and the actuation element 40 do not rest against the lower textile layer 32, but lie on the middle textile layer 34.

Moreover, the pressure plate 44 extends beyond the protective wall 42.

In this second embodiment the trigger device 28 has a cover 66, which extends out of the base body 12 and which completely surrounds the protective wall 42 and the pressure plate 44.

The cover 66 is e.g. elastic. It is conceivable that the cover contains no silicone, but can be glued to the base body. The cover 66 is for example deep-drawn.

In this embodiment the trigger device 28, for better reachability, has a height of at least 3 mm above the lower textile layer 32. A third embodiment of the glove 10 is represented in FIG. 8, wherein the glove 10 is shown stretched out in a top view.

Unlike in the first embodiment, the thumb hole 14 is not bordered on its wrist-side end by one or more of the textile layers 32, 34 or 36, but the base body 12 is opened on the wrist side.

Instead, an elastic element 68, e.g. an elastic band, which borders the thumb hole 14 on the wrist side is secured to the base body 12.

In this way the palm section 16 and the back section 18 can be moved relative to each other, similarly to a pivoting movement about an axis through the area of the stop 15 perpendicularly to the base body 12.

The thumb hole 14 increases in size at its wrist-side end.

A fourth embodiment of the glove is represented in FIG. 9. In this embodiment the glove 10 is a full glove with fingers, wherein the position of the trigger device 28 has not altered.

Beyond the embodiment examples shown, it is e.g. conceivable that the base body 12 can be a circular-knitted or a flat-knitted fabric.

It is also conceivable that the trigger device 28 has a capacitive actuation element 40. The trigger surface 45 then corresponds to the touch-sensitive surface of the capacitive actuation element 40. The structure is then still similar to that of FIGS. 4 and 5.

Of course, the different described features of the embodiments can be combined with each other as desired, even individually.

In the embodiment examples, a glove 10 for the right hand is described. Of course, the disclosure also comprises a glove 10 which is intended to be worn on the left hand. Such a glove for the left hand is identical to the described glove for the right hand, but mirror-inverted for example via the longitudinal axis L or a similar axis.

The invention claimed is:

1. A glove, comprising:
   a base body, in a form of a band, with two opposing longitudinal edges, a palm section configured for covering a palm of a hand, a back section configured for covering a back of the hand, and a thumb hole between the palm section and the back section, the two longitudinal edges of the base body being a finger-side edge which faces a user's fingers and a wrist-side edge which faces the user's wrist when the glove is being worn, each of the palm section and the back section having a portion of the finger-side edge and a portion of the wrist-side edge;
   a tongue forming a protrusion of the finger-side edge protruding upward beyond at least one of the finger-side edge of the palm section or an imaginary extension of the finger-side edge of the palm section;
   a trigger device provided on the tongue, wherein the trigger device is positioned on the tongue such that, when the glove is being worn, the trigger device is configured to rest against a radial side of a metacarpophalangeal joint of an index finger of a user's hand,
   wherein the tongue has a distal edge, a first side edge extending from the palm section, and a second side edge separate from the first side edge and extending from the back section.

2. The glove according to claim 1, wherein the finger-side edge of the base body is continuous.

3. The glove according to claim 1, wherein the finger-side edge is without a finger hole for a single finger, without a finger hole for two fingers and without a finger hole for three fingers.

4. The glove according to claim 1, wherein the tongue forms a single sheet of material when the glove is stretched out on a surface.

5. The glove according to claim 1, wherein the tongue does not fully encompass one or more of the user's fingers when being worn.

6. The glove according to claim 1, wherein the entire glove has no finger holes except for a thumb hole when the glove is stretched out on a surface.

7. The glove according to claim 1, wherein the thumb hole is bordered by a stop at its finger-side end,
   wherein the thumb hole has a longitudinal axis and the trigger device is spaced apart from the stop by a first distance in a direction of the longitudinal axis towards the finger side of the glove.

8. The glove according to claim 1, wherein the thumb hole is bordered by a stop at its finger-side end,
   wherein the thumb hole has a transverse axis and the trigger device is spaced apart from the stop by a second distance in a direction of the transverse axis towards the back section.

9. The glove according to claim 8, wherein the second distance is smaller than 40 mm.

10. The glove according to claim 1, wherein the trigger device has an actuation element and a trigger surface, through which the actuation element can be actuated, wherein the trigger surface has a principal direction.

11. The glove according to claim 10, wherein the principal direction is configured to run substantially parallel to a longitudinal axis or at an angle of less than 45° to the longitudinal axis.

12. The glove according to claim 1, wherein at least one of the trigger device, a protective wall, a pressure plate and an actuation element is covered by a material textile layer.

13. The glove according to claim 1, wherein the glove has a holder for an electronics module, wherein the holder has at least one electrical contact element, which is electrically connected to the trigger device.

14. The glove according to claim 1, wherein the finger-side edge of the palm section or the imaginary extension of the finger-side edge of the palm section at least one intersects of a trigger surface when the glove is stretched out and runs between a center of the trigger surface and a stop.

15. The glove according to claim 1, wherein the finger-side edge of the palm section, when the glove is being worn, is configured to run on a wrist side of at least the metacarpophalangeal joint of the index finger.

16. The glove according to claim 1, wherein the tongue is part of the base body.

17. The glove according to claim 1, wherein the tongue is located above the thumb hole.

18. The glove according to claim 1, wherein the glove comprises at opposed ends of the base body a first securing element and a second securing element detachably securable to one another.

\* \* \* \* \*